United States Patent Office 2,744,147
Patented May 1, 1956

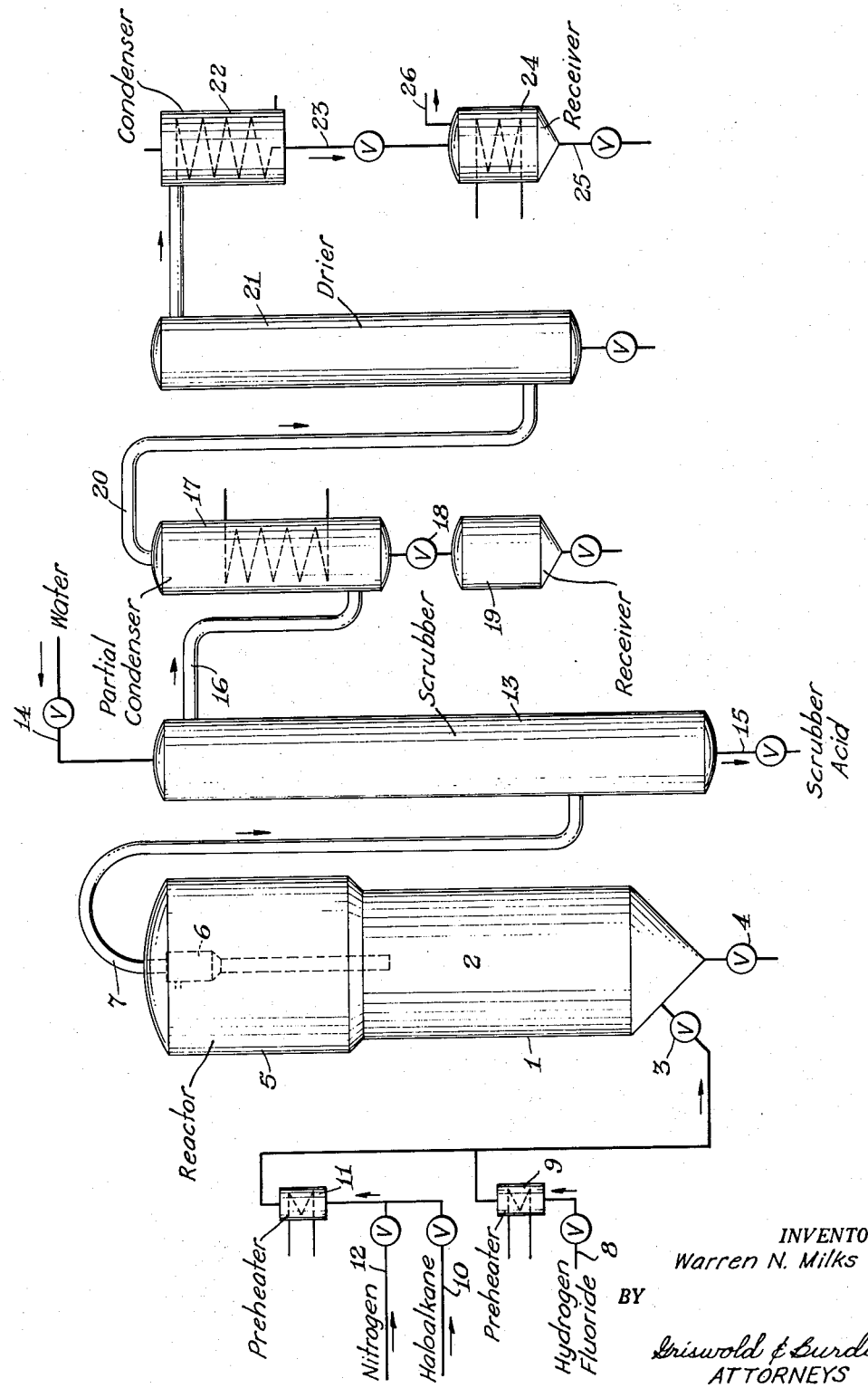

2,744,147
FLUORINATION OF HALOALKANES WITH A CATALYST CONTAINING GAMMA ALUMINA

Warren N. Milks, Freeport, Tex., assignor to The Dow Chemical Company, Midland, Mich., a corporation of Delaware Application February 4, 1952, Serial No. 269,728

12 Claims. (Cl. 260—653)

This invention relates to an improved fluorination catalyst and to a process for fluorinating haloalkanes using the improved catalyst.

Heretofore, it has been known that some haloalkanes can be fluorinated by vapor phase reaction with hydrogen fluoride in the presence of metallic halides, a large number of which have been suggested as catalysts for the reaction. Daudt et al. in U. S. Patent 2,005,707 carry out the fluorination reaction with catalysts consisting of the halides of certain metals preferably supported on a catalytically active material, such as activated carbon, but which may be supported on a relatively inert material, such as porous fused alumina, i. e., alpha alumina.

It now has been found that fluorination catalysts much more active than those of Daudt can be prepared by impregnating an activated alumina, preferably gamma alumina, with the halides of a certain few metals, i. e. cobalt, nickel, and chromium. The combination of one or more of these particular metal halides with activated alumina results in very active catalysts which direct the course of the reaction toward the formation of greater proportions of the more highly fluorinated products than has previously been achieved. These new catalysts give good conversions and high yields of fluorinated compounds and are more effective at lower temperatures than any other known catalysts for the fluorination reaction with hydrogen fluoride.

It has also been discovered that the improved catalysts of the invention give particularly desirable results when employed in a fluidized catalyst bed process which is characterized by very uniform temperature control, high uniformity in the degree of fluorination, and minimum breakdown of the haloalkane.

The haloalkanes which may be fluorinated in accord with the invention are partially or completely halogenated saturated hydrocarbons, which contain no more than two carbon atoms, no iodine, and at least one halogen other than fluorine. More specifically, these saturated haloalkanes have from one two carbon atoms, including at least one carbon atom attached to a minimum of two halogens of atomic number not greater than 35, i. e., fluorine, chlorine, or bromine, at least one of which is of atomic number from 17 through 35 inclusive, i. e., chlorine or bromine.

According to the most preferred embodiment of the invention, the haloalkane has from one to two carbon atoms and from three to four chlorine atoms all of which are attached to a single carbon atom, i. e. the haloalkane is carbon tetrachloride, chloroform, or 1,1,1-trichloroethane. Other haloalkanes which may be fluorinated by the process of the invention are methylene chloride, 1,1-dichloroethane, 1,1,2-trichloroethane, uns. tetrachloroethane, methylene bromide, bromoform, carbon tetrabromide, acetylene tetrabromide, dichlorofluoromethane, dichlorodifluoromethane, dibromodichloromethane, bromochlorodifluoromethane, etc. Fluorination according to the invention proceeds with minimum formation of by-products for those haloalkanes having a normal boiling point below 200° C. and thermally stable per se up to 200° C.

The new and improved fluorination catalysts are usually prepared by impregnating an activated alumina support, such as gamma-alumina, in an aqueous solution of one or more halides of cobalt, nickel, or chromium and drying the alumina so impregnated. The resulting dry impregnated material is then advantageously activated by passing a stream of hydrogen fluoride over it in the absence of haloalkane. Any of the halides of the three metals aforesaid may be used in preparing the catalysts, although as a general practice, the chlorides are used.

Of the activated aluminas which constitute the supports for the catalysts of the invention, gamma alumina is preferred. Any of the other crystalline modifications of the activated aluminas reported by Stumpf et al. in Industrial and Engineering Chemistry, vol. 42, pages 1398–1403 (1950) are suitable, such as chi alumina, kappa alumina, etc. As is known, all such activated aluminas contain a small proportion of water, less than 2 per cent by weight. Alpha alumina, such as porous fused alumina, is not an activated alumina. It contains no water of constitution and is not satisfactory as a catalyst support. Activated aluminas are usually prepared by the controlled calcination of alumina hydrates in the temperature range from 300° to 800° C. although temperatures up to 1000° C. or even higher may sometimes be employed if the calcination is brief and the moisture content of the surrounding gaseous atmosphere is high. Highly desirable aluminas which are commercially available are the activated aluminas prepared by the calcination of a rock-like alumina trihydrate derived from bauxite. The original granules do not shrink appreciably during this calcination, and the loss of water with the accompanying recrystallization creates a large surface area. These particulated aluminas are readily impregnated in solutions of metal halides without change in physical shape or loss of structural rigidity.

Although fluorination catalysts according to the invention have been prepared from supports containing approximately equal amounts of gamma alumina and residual alumina hydrates, such as gamma alumina monohydrate (boehmite), these supports are much less satisfactory for the formation of highly fluorinated products. In other words, the best supports for the catalysts of the invention should contain as the major component, one or more of the activated aluminas hereinbefore characterized, preferably gamma alumina.

The particle size of the activated alumina support must be such that the catalyst is fluidized by the stream of gases flowing into the reactor at the rate of flow for which the reactor is designed. It is usually preferred that the catalyst particles be from 40 to 200 mesh, U. S. Sieve Series. If desired, an inert gas such as nitrogen can be passed through the reactor together with the reactants in order to increase the flow rate therethrough. The resulting increased flow permits use of coarser catalyst particles.

In practice, the catalysts are best prepared by dissolving a chloride of cobalt, nickel, or chromium in water or dilute hydrochloric acid to form a strong solution of the metal chloride. An activated alumina support then is soaked in the solution until saturated, and the resulting material is heated in air with stirring, preferably at 100° to 300° C., until dry. The impregnation procedure is controlled so that the final dried material contains an effective proportion of the metallic halide in amounts ranging from less than 1 per cent to 20 per cent by weight. Greater concentrations do not increase the effective catalysis and are often rapidly removed from the alumina support through attrition and dusting. In practice, the final dried material preferably contains from 5 to 20 per cent, suitably 10 per cent, by weight of the metallic halide. This material may be employed per se in fluorinating haloalkanes according to the invention.

It is much preferred, however, to activate the dry impregnated activated alumina by passing anhydrous hydrogen fluoride over it in the absence of haloalkane at an elevated temperature. This latter should approximate or be somewhat lower than, the intended reaction temperature for the organic fluorination in which the catalyst is to be used, e. g. 200° C. for a fluorination to be carried out at 250° C. The activating treatment appears to convert at least part of the metallic halide impregnant (if other than fluoride) to metallic fluoride and also to effect the character of the activated alumina, by at least partial conversion of the surface material to aluminum fluoride. Passage of the hydrogen fluoride is preferably continued until interaction of hydrogen fluoride with the dried material substantially ceases. The stabilization is most conveniently carried out in the same reaction vessel in which the organic fluorination is to be conducted, with the impregnated alumina maintained as a fluidized bed, as by the injection of an inert gas such as nitrogen.

In carrying out fluorination of haloalkanes according to the invention using the new catalysts hereinbefore characterized, the haloalkane is vaporized and passed together with hydrogen fluoride through a bed of the catalyst at elevated temperature, preferably in the fluidized state. The process is satisfactorily carried out when the rate of gas flow in the reactor, calculated as cubic feet of gas per second, at reactor temperature, divided by the cross-sectional area of the reactor, is from 0.15 to 0.35 feet per second. Preferably the gas flow is 0.25 feet per second at the temperature of reaction.

The ratio of hydrogen fluoride to haloalkane employed in the fluorination reaction may be varied within wide limits depending on the end product desired. In general, however, at least one mole of hydrogen fluoride should be used per mole of haloalkane. The preferred ratio, for making a maximum of any specific fluorinated compound, is from one to two times the proportion stoichiometrically required for producing that compound. For instance, in converting carbon tetrachloride to chlorotrifluoromethane, there should be at least about 3.0 moles of hydrogen fluoride per mole of carbon tetrachloride.

Temperatures from 150° to 500° C. may be considered for all practical purposes as the operative limits of the fluorination. Haloalkanes are readily fluorinated from 180° to 425° C. with a more restricted range of 200° to 350° C. preferred. The fluorination temperature is dependent on a number of variables such as identity of the haloalkane, catalyst composition, contact time, product desired, etc. With respect to haloalkanes, progressively higher temperatures are required to fluorinate $CCl_4$, $CHCl_3$, and $CH_2Cl_2$. In general, when relatively high conversions of the haloalkane are desired, the optimum temperature varies inversely as contact time and directly with the intended degree of fluorination. That is to say, the temperature may be reduced slightly as contact time is increased; conversely, the higher the desired degree of fluorination of a given compound, the higher the temperature required. For instance, higher temperatures are ordinarily required to give good conversions of $CCl_4$ to $CClF_3$ than to $CCl_2F_2$, as will be apparent in the examples. The optimum temperature also varies with the activity of the catalyst which in turn is dependent on other variables, such as the age of the catalyst and possible surface coatings e. g. carbon, due to prolonged use. The optimum operating conditions for any given fluorination within the ranges discussed can easily be determined by trial.

Fluorination proceeds at an extremely rapid rate according to the method of the invention. High yields of fluorinated products based on the hydrogen fluoride consumed, are achieved with contact times from 2 to 3 seconds. Accordingly, there is usually no particular advantage in using contact times longer than 15 seconds. In some instances it may be desirable to use relatively short contact times, such as a fraction of a second, but most satisfactory operation is usually achieved when a contact time from 1 to 10 seconds is employed.

The fluorination reaction is ordinarily carried out at pressures slightly above atmospheric. Aside from greater capacity per unit volume of catalyst, higher pressures may be employed to give more highly fluorinated compounds. In general, both superatmospheric and subatmospheric pressures are operable.

The process of the invention may be carried out in the apparatus illustrated schematically in the accompanying drawing. As there shown, fluorination of the haloalkane feedstock is carried out in a reactor 1 in which a fluidized bed 2 of catalyst prepared according to the invention is established in the lower portion. The reactor is provided at the bottom with a valved feed inlet 3 and a valved clean out drain 4. The upper portion 5 of the reactor forms a catalyst-disengaging space within which is a conventional catalyst cyclone separator 6 leading to a top gas outlet line 7. The reactor may, for some reactions, include heating means not illustrated.

Hydrogen fluoride under pressure from a valved line 8 passes through a preheater 9 to the reactor inlet 3. The haloalkane feed from a valved line 10 also passes through a separate preheater 11 to the reaction inlet 3. Nitrogen under pressure from a valved line 12 may be used to fluidize the catalyst bed initially, help maintain the bed fluid, purge the reactor, etc.

In the reactor, the entering gases serve to fluidize the catalyst bed in which the haloalkane and hydrogen fluoride interact to form fluorinated products. These latter leave through the top outlet line 7, and pass to a scrubber tower 13 in which they are washed countercurrently by a stream of water entering at the top through a valved line 14. Aqueous scrubber acid, consisting mainly of dilute hydrochloric and hydrofluoric acids, leaves through the valved bottom outlet 15. The scrubbed gases then flow through a line 16 to a partial condenser 17 in which any remaining water and some higher boiling organic products are liquefied and drop through a valved line 18 into a receiver 19 from which they may later be removed as a by-product. The vapors surviving the partial condenser flow through a line 20 to a drying column 21 which may contain calcium chloride, sulfuric acid, or some other desiccant and thence to a condenser 22 maintained at low temperature by refrigeration. The fluoroalkane vapors are condensed and fall through a valved line 23 into a final refrigerated product receiver 24, from which they may be withdrawn periodically through a valved product line 25. Any nitrogen or other noncondensable gases escape through a vent 26, where they may, if desired, be collected and returned to the feedline 12. In an alternative arrangement, the scrubber 13 may be preceded by a partial condenser 17 so that unreacted hydrogen fluoride may be recovered in essentialy anhydrous form.

In practice of the invention, sufficient catalyst is charged into the reactor to provide a substantial bed thereof. The rates of flow of the inlet gases entering the reactor 1 are adjusted to maintain the catalyst bed in the fluidized state. The heat-exchangers 9 and 11 are regulated to afford sufficient preheating to hold a predetermined temperature in the reactor, or additional heating may be supplied directly to the reactor. The partial condenser 17 is set to maintain a temperature below 100° C. to condense out water, preferably 30° C. to 50° C. The final condenser 22 is usually controlled at a temperature sufficiently low to insure total condensation of fluorinated organic products. (In an alternative procedure, the condenser 22 may be omitted and the fluorinated products collected in the gaseous state.)

The following examples serve to illustrate the invention but are not be be construed as limiting the scope.

*Example 1*

Equipment similar to that illustrated in the attached drawing was used for the fluorination of carbon tetrachloride with hydrogen fluoride, except that the final refrigerated condenser 22 was omitted. A vertical nickel reactor, 2 inches inside diameter by 20 inches in length, was charged with about 600 ml. of a catalyst having a particle size of 40 to 200 mesh, U. S. Sieve Series. This was produced by impregnating an activated alumina with nickelous chloride in an amount equal to 10 per cent by weight of the dry impregnated material, and thereafter heating to dryness, as hereinbefore described. The alumina support was a commercially activated alumina (Alcoa F–10) produced by the calcination of alumina trihydrate made from bauxite, and was found by X-ray diffraction analysis to consist preponderantly of gamma alumina with some chi alumina. Before starting the fluorination, the dry alumina impregnated with nickelous chloride was activated by the following procedure:

Nitrogen preheated to a temperature of 100° C. was passed into the reactor at a rate sufficient to fluidize the particles therein. Additional heat was supplied through the wall of the reactor to maintain a temperature of about 200° C., as measured by a thermowell centered in the reactor. Anhydrous hydrogen fluoride was then allowed to enter the reactor at a flow rate of about 3 cubic inches per second, based on standard conditions, and the flow of nitrogen was adjusted to about 1 cubic inch per second. The gas leaving the reactor contained, in addition to hydrogen fluoride, hydrogen chloride, and traces of water. This gas was passed through a water scrubber as shown in the drawing. After evolution of hydrogen chloride ceased, as shown by periodic analyses of the scrubber water, activation of the catalyst was considered complete.

Fluorination was then started by passing carbon tetrachloride preheated to 125° C. into the reactor at a flow rate at standard conditions of about 1.5 cubic inches per second. The flow rates of nitrogen and hydrogen fluoride were decreased to about 0.5 to 1.5 standard cubic inches per second respectively. The reactor temperature was adjusted to 304° C. and continuous operation under these conditions was carried out for a period of five hours. After the flow rates and temperatures became constant, samples were taken of the scrubber water, partial condenser receiver, and product gases leaving the drier. The product gas sample was condensed and distilled analytically in a low temperature Poddielniak column. The data for the fluorination reaction appear in the following table. Product yields based on the hydrogen fluoride consumed were calculated by dividing the moles of hydrogen fluoride converted to fluoroalkane by the total moles of hydrogen fluoride consumed. The hydrogen fluoride consumption was determined from total acid and total chloride titrations on the scrubber water.

$NiCl_2$-activated alumina  
Temperature (average)_____°C\_\_ 304  
Mole ratio $HF/CCl_4$_____ 1:1  
HF consumption_____mole per cent\_\_ 91  
Yields (HF basis):  
    $CCl_3F$ _____do\_\_\_\_ 7.4  
    $CCl_2F_2$ _____do\_\_\_\_ 15.2  
    $CClF_3$ _____do\_\_\_\_ 65.5

*Example 2*

Another fluorination run on $CCl_4$ was made in the equipment and according to the procedure outlined in Example 1 except that the activated alumina employed in Example 1 was impregnated with 10 per cent by weight of cobaltous chloride. The following table lists the data for the reaction.

$CoCl_2$-activated alumina  
Temperature (average)_____°C\_\_ 300  
Mole ratio $HF/CCl_4$_____ 1:1  
HF consumption_____mole per cent\_\_ 100  
Yield (HF basis):  
    $CCl_3F$ _____do\_\_\_\_ 7.1  
    $CCl_2F_2$ _____do\_\_\_\_ 17.8  
    $CClF_3$ _____do\_\_\_\_ 68.6

*Example 3*

Carbon tetrachloride was fluorinated according to the procedure of Example 1 except that chromous chloride was used to impregnate the activated alumina. The table contains the reaction data.

$CrCl_2$—activated alumina  
Temperature (average)_____°C\_\_ 315  
Mole ratio $HF/CCl_4$_____ 1:1  
HF consumption_____mole per cent\_\_ 100  
Yields (HF basis):  
    $CCl_3F$ _____do\_\_\_\_ 10  
    $CCl_2F_2$ _____do\_\_\_\_ 17  
    $CClF_3$ _____do\_\_\_\_ 50

*Example 4*

Two runs on the fluorination of $CHCl_3$ were made in the same reactor and according to the procedure of Example 1 using catalysts prepared exactly as those of Examples 1 and 2. The following table lists the reaction data:

|  | $NiCl_2$—Activated Alumina | $CoCl_2$—Activated Alumina |
|---|---|---|
| Temperature (Average) _____°C\_\_ | 278 | 284 |
| Mole Ratio, $HF/CHCl_3$ _____ | 2:1 | 2:1 |
| HF Consumption _____mole percent\_\_ | 96.4 | 96.5 |
| Yield (HF Basis): |  |  |
|   $CHCl_2F$ _____do\_\_\_\_ | 2.4 | 1.3 |
|   $CHClF_2$ _____do\_\_\_\_ | 3.9 | 6.0 |
|   $CHF_3$ _____do\_\_\_\_ | 73.0 | 83.7 |

*Example 5*

The fluorination of 1,1,1-trichloroethane was conducted in equipment and according to the procedure of Example 1. The catalyst was also prepared by the procedure of Example 1 except that $CoCl_2$ was impregnated on a commercially available activated alumina (Alcoa H–41) which was found by X-ray diffraction analysis to consist preponderantly of gamma alumina with some chi alumina. To demonstrate the superiority of the preferred metal halides of the invention, a second run was made over a catalyst of $CuCl_2$ (not according to the invention) on the same activated alumina. The comparative data are listed in the table.

|  | $CoCl_2$—Activated Alumina | $CuCl_2$—Activated Alumina |
|---|---|---|
| Temperature (Average) _____°C\_\_ | 290 | 300 |
| Mole Ratio, $HF/CCl_3CH_3$ _____ | 1.2:1 | 2:1 |
| HF Consumption _____mole percent\_\_ | 68 | 20 |
| Yield (HF Basis): |  |  |
|   $CClF_2CH_3$ _____do\_\_\_\_ | 3 | 0 |
|   $CF_3CH_3$ _____do\_\_\_\_ | 75 |  |

*Example 6*

To demonstrate the ability of the catalysts of the invention in effectively fluorinating haloalkanes at relatively low temperatures, $CCl_4$ was reacted with HF at 185° C. in the equipment according to the procedure of Example 1 over the $CoCl_2$—activated alumina catalyst of Example 2. The following table lists the reaction data.

$CoCl_2$—activated alumina  
Reactor temperature (average)_____°C\_\_ 185  
HF feed_____gm. moles per hour\_\_ 7.8  
$CCl_4$ feed_____do\_\_\_\_ 7.7  
Recovery:  
    $CCl_3F$ _____do\_\_\_\_ 0.51  
    $CCl_2F_2$ _____do\_\_\_\_ 1.09  
    $CClF_3$ _____do\_\_\_\_ 1.20  
Product distribution:  
    $CCl_3F$ _____do\_\_\_\_ 18.2  
    $CCl_2F_2$ _____do\_\_\_\_ 39.0  
    $CClF_3$ _____do\_\_\_\_ 42.8  
HF consumption_____do\_\_\_\_ 98.7

Example 7

To show the effect of temperature on the reaction of $CCl_4$ with 300 mol per cent of HF, the following three runs were made. Fluorination was otherwise carried out according to the procedure of Example 1 over the $CoCl_2$—activated alumina catalyst as described in Example 2. At the 3:1 ratio of HF to $CCl_4$, the HF consumption was less and the $CCl_4$ conversion higher than at the 1:1 ratio of Example 6. The following table contains the observed results.

| Temperature, ° C. | 250 | 300 | 350 |
|---|---|---|---|
| HF Feed_____gm. moles/hr__ | 10.85 | 10.2 | 8.05 |
| $CCl_4$ Feed_____do____ | 3.21 | 3.0 | 2.5 |
| Mole ratio, HF/$CCl_4$_____ | 3.2 | 3.4 | 3.2 |
| Organic Recovery: | | | |
| $CCl_4$_____gm. moles/hr__ | .020 | .019 | 1.002 |
| $CCl_3F$_____do____ | .917 | .185 | .033 |
| $CCl_2F_2$_____do____ | 2.265 | 2.10 | .210 |
| $CClF_3$_____do____ | .039 | .75 | .945 |
| HF Consumption_____mole percent__ | 51.4 | 61.7 | 73.5 |
| $CCl_4$ Conversion_____do____ | 99.4 | 99.3 | 99.9 |
| Product Distribution: | | | |
| $CCl_3F$_____do____ | 28.4 | 6.1 | 1.5 |
| $CCl_2F_2$_____do____ | 70.3 | 69.2 | 55.3 |
| $CClF_3$_____do____ | 1.3 | 24.1 | 43.2 |
| Organic Recovered_____do____ | 100.9 | 101.8 | 87.6 |

I claim:

1. A method of fluorinating haloalkanes that comprises establishing a fluidized bed of a catalyst consisting essentially of a halide of at least one metal of the group consisting of cobalt, nickel, and chromium impregnated on an activated alumina consisting preponderantly of gamma alumina and passing through the fluidized bed, at a temperature between 180° to 425° C., at least an equimolar mixture of hydrogen fluoride with a haloalkane having from one to two carbon atoms, including at least one carbon atom atached to a minimum of two halogens of atomic number not greater than 35, at least one of which is of atomic number from 17 through 35 inclusive.

2. A method according to claim 1 in which the haloalkane is $CCl_4$.

3. A method according to claim 1 in which the haloalkane is $CHCl_3$.

4. A method according to claim 1 in which the haloalkane is $CCl_3CH_3$.

5. A method according to claim 1 in which the haloalkane is $CHCl_2CH_3$.

6. A method of fluorinating haloalkanes which comprises passing a vapor mixture of a haloalkane having from one to two carbon atoms, including at least one carbon atom attached to a minimum of two halogens of atomic number not greater than 35, at least one of which is of atomic number from 17 through 35 inclusive, and at least an equimolar proportion of hydrogen fluoride at a reaction temperature greater than 180° C. through a bed of a catalyst consisting essentially of a halide of at least one metal of the group consisting of cobalt, nickel, and chromium impregnated on an activated alumina which always contains gamma alumina and consists preponderantly of at least one member of the group consisting of gamma, chi, and kappa alumina.

7. A method of fluorinating haloalkanes that comprises establishing a fluidized bed of a catalyst consisting essentially of a halide of at least one metal of the group consisting of cobalt, nickel, and chromium impregnated on an activated alumina which always contains gamma alumina and consists preponderantly of at least one member of the group consisting of gamma, chi, and kappa alumina and passing through the fluidized bed, at a temperature between 180° C. to 425° C., at least an equimolar mixture of hydrogen fluoride and a haloalkane having from one to two carbon atoms, including at least one carbon atom attached to a minimum of two halogens of atomic number not greater than 35, at least one of which is of atomic number from 17 through 35 inclusive.

8. A method of fluorinating a haloalkane which comprises passing a vapor mixture of a haloalkane having from one to two carbon atoms, including at least one carbon atom attached to a minimum of three halogens of atomic number not greater than 35, at least one of which is of atomic number from 17 through 35 inclusive, and at least an equimolar proportion of hydrogen fluoride through a bed of a catalyst consisting essentially of a halide of at least one metal of the group consisting of cobalt, nickel, and chromium supported on an activated alumina consisting preponderantly of gamma alumina, maintaining a reaction temperature in the range of 180° to 425° C., and separating a preponderance of at least a trifluorinated compound from the organic reaction product so produced.

9. A method according to claim 8 wherein the haloalkane has from one to two carbon atoms, including at least one carbon atom attached to a minimum of three halogens of atomic number not greater than 17, at least one of which has an atomic number of 17.

10. A method according to claim 9 wherein the haloalkane is a chloroalkane.

11. A method of fluorinating a haloalkane which comprises passing a vapor mixture of a haloalkane having from one to two carbon atoms, including at least one carbon atom attached to a minimum of two halogens of atomic number not greater than 35, at least one of which is of atomic number from 17 through 35 inclusive, and at least an equimolar proportion of hydrogen fluoride, through a bed of a catalyst maintained at a temperature of from about 180° C. to about 425° C., said catalyst having been prepared by the steps which comprise substantially saturating an activated alumina consisting preponderantly of at least one member of the group consisting of gamma, chi, and kappa alumina, which alumina always includes gamma alumina, with an aqueous solution of a chloride of at least one of the metals of the group consisting of cobalt, nickel, and chromium to incorporate about 1 to 20 per cent by weight of metal chloride in the impregnated material, heating the metal chloride containing alumina to dryness in the absence of hydrogen fluoride, and thereafter activating the dried material by passing a stream of hydrogen fluoride therethrough until interaction of hydrogen fluoride with the dried material substantially ceases.

12. A method of fluorinating a haloalkane which comprises passing a vapor mixture of a haloalkane having from one to two carbon atoms, including at least one carbon atom attached to a minimum of two halogens of atomic number not greater than 35, at least one of which is of atomic number from 17 through 35 inclusive, and greater than an equimolar proportion of hydrogen fluoride through a bed of a catalyst maintained at a temperature of from about 180° C. to about 425° C., said catalyst having been prepared by the steps which comprise substantially saturating an activated alumina consisting preponderantly of gamma alumina with an aqueous solution of a chloride of at least one of the metals of the group consisting of cobalt, nickel, and chromium to incorporate about 1 to 20 per cent by weight of metal chloride in the impregnated material, heating the metal chloride containing alumina to dryness in air at a temperature of from about 100° C. to about 300° C., and thereafter activating the dried material by passing a stream of hydrogen fluoride gas through the dried material in bed form in the absence of haloalkane at an elevated temperature of from about 180° C. to about 425° C. until interaction of hydrogen fluoride with the dried material substantially ceases.

(References on following page)

References Cited in the file of this patent

UNITED STATES PATENTS

| | | |
|---|---|---|
| 2,005,710 | Daudt et al. | June 18, 1935 |
| 2,381,562 | Stewart | Aug. 7, 1945 |
| 2,471,525 | Hillyer et al. | May 31, 1949 |
| 2,574,480 | Hillyer et al. | Nov. 13, 1951 |
| 2,579,669 | Hillyer et al. | Dec. 25, 1951 |

OTHER REFERENCES

Advances in Catalysis, vol. III, April 1951, page 255.